Patented May 25, 1948

2,442,321

UNITED STATES PATENT OFFICE 2,442,321

METHOD OF MAKING GYPSUM BOARD AND LIKE GYPSUM PRODUCTS, AND PRODUCTS OF SUCH PROCESS

Charles H. Cuppett, Wayne Township, Passaic County, N. J., assignor to Newark Plaster Company, Newark, N. J., a corporation of New Jersey No Drawing. Application January 17, 1948, Serial No. 2,969

10 Claims. (Cl. 154—86)

This invention relates to a method of manufacturing gypsum board and like gypsum products and products of such process.

The present application is a continuation-in-part of my co-pending application, Serial No. 733,425, filed March 8, 1947.

The term "gypsum board" as used in this application, refers to what is known in the trade as calcined gypsum wall board, gypsum lath, plain or perforated, gypsum liner board or plaster board, and gypsum sheathing, both single and laminated. Although the invention is primarily intended for production of calcined gypsum board having paper facings on its opposite sides, it is, in its broader aspect, useful in relation to continuous production of cast gypsum slabs without paper facings, blocks and roof slabs.

The object of this invention is to produce gypsum board by a more economical process than is now available to the industry, nevertheless permitting the use of the rather expensive apparatus now generally employed.

One of the processes now in use in producing gypsum board comprises mixing calcined plaster with water to form a slurry; forming a foam by means of water and a foaming agent in a foam cell or other mixing device; stabilizing this foam by means of boiled starch (which has the additional property of causing the paper liners to adhere to the gypsum board) and mixing the stabilized starch with the slurry in a secondary mixer where rapid mixing action causes the stabilized foam to be folded in the slurry and produces a finished slurry containing bubbles or air cells. The finished slurry is then processed in the usual manner by being sandwiched in between two paper liners, levelled by a squeeze roll, cut to length and dried.

It has been found by experience that about 13 pounds of dry starch are needed for each 1,000 square feet of ⅜ inch gypsum board produced and that, in addition, approximately 1¼ to 1½ pounds of a suitable foaming agent. The amount of foaming agent used controls the cellular structure of the finished board. Increasing the amount of foaming agent, within the bounds well-known to those experienced in the industry, produces lighter board than that produced by the aforementioned generally standard proportions. Some of the processes, under which large quantities of gypsum board have been and are being manufactured, are referred to in the following United States Patents: Nos. 1,500,452 to Haggerty; 1,938,354, 2,007,133, 2,017,022, 2,079,338 and 2,080,009, all to Roos; and Reissue 22,816 to Camp, to which reference is made, not only for the processes per se, but also for information with respect to different types of foaming agents which have been recommended at times for use in making gypsum board. In the past few years the industry has utilized as foaming agents potassium or sodium salts of a series of prepared rosins and also alkyl sulfates. Of the former, an alkali or alkaline earth soaps of rosin acids (known in the trade as Dresinate), or of the latter, the alcohol sulfate (known in the trade as Duponol WA) have been utilized as foaming agents in the preparation of gypsum board. When the latter types of foaming agents are utilized, it is usual to use from 1¼ to 1½ pounds thereof for the production of each 1,000 square feet of ⅜ inch gypsum board and 13 pounds of dry starch. The latter proportions produce ⅜ inch calcined gypsum board weighing about 1,500 pounds to the thousand square feet. As the amount of the foaming agent is increased, the board becomes lighter, and as the amount of foaming agent is decreased, or entirely eliminated, the board becomes heavier.

This invention permits the elimination of starch entirely from use in the production of calcined gypsum board and like gypsum products without in anywise effecting the acceptability of the product or its compliance to the standards set up in U. S. Federal specifications 51A. The product of the process of this invention has been subjected to tests by the National Bureau of Standards (see its reference Nos. FP 2555 and FP 2556) from which it appears that the product of this invention is in all respects at least equal to that of board made under the currently used older processes. The process of this invention may be carried out with existing plant installations without the necessity of installing new machinery or equipment or additions thereto. This invention also permits such standard machinery to be run at a higher speed, thereby increasing production about 8-10 per cent. The elimination of starch in the process effects a considerable saving in money because of its high price and large quantities used in the now standard processes. In addition, the elimination of the use of starch will make available as food large quantities of corn and wheat grain, which are used in making the type of starch now used in this industry.

Instead of using starch in the process, it has been found by this invention that completely satisfactory calcined gypsum board and like gypsum products can be produced by using an alkaline-catalyzed partial condensation product of urea and formaldehyde, which compound has also been referred to in said parent case (Serial No.

733,425), as an adhesive laminating type of urea-formaldehyde resin, and will be referred to in this specification by the former designation or as "said resin." As little as from 7½ to 12½ ounces of said resin will stabilize the foam where heretofore in the order of 13 pounds of dry starch have been used. Such alkaline-catalyzed partial condensation product of urea and formaldehyde is available in two forms, a liquid (known in the trade as URAC 180 and Uformite 430) and a powder (known in the trade as URAC 110). The amount of foaming agent used is dependent upon the weight of the board which it is desirous of producing and as a general rule it is preferred to use from 5 to 7½ grams of the aforementioned foaming agents (Dresinate or Duponol WA) to 10 pounds gypsum.

It has been found that the said resin, alkaline-catalyzed partial condensation product of urea and formaldehyde, may be varied, to each 10 pounds of calcined gypsum or stucco, from 2¼ grams to 6 grams. When, however, said resin is used in powder form, the amount thereof is reduced to about 60% of that used in the liquid form.

The process of this invention may be carried out on the standard type of machinery now quite universally used in the making of calcined plaster board and like products utilizing the foam producing cells by passing the foaming agent and the resin therethrough and folding the foam thus produced into the gypsum-water slurry. It is preferred, however, to utilize such standard apparatus but not to preform a foam by the use of the foam cells, but rather to pass the required quantities of foaming agent and resin through the apparatus without whipping it into a preformed foam, from whence it will be introduced into the secondary mixer and mixed in as part of the complete slurry.

The following are examples for the utilization of this invention:

*Example 1*

When gypsum board is made according to the foaming process, the starch is omitted entirely and is replaced by 3½ grams of the liquid type of said resin, alkaline-catalyzed partial condensation product of urea and formaldehyde (URAC 180 or Uformite 430), to each 10 pounds of calcined gypsum or stucco and 7½ grams of potassium or sodium salts of special rosins (known in the trade as Dresinate) acting as a foaming agent, together with from 6.25 to 6.5 pounds of water. These materials are mixed in the usual steps practiced in connection with the foaming type of process for making gypsum board which permits the utilization of existing apparatus and equipment.

*Example 2*

In place of using 3½ grams of the said resin, alkaline-catalyzed partial condensation product of urea and formaldehyde, as set forth in Example 1, 6 grams thereof may be used, and instead of using 7½ grams of the foaming agent of Example 1, 5 grams thereof may be used. In other respects, the process of preparing the slurry and handling it are the same.

*Example 3*

In place of using 3½ grams of said resin as set forth in Example 1, 5 grams thereof may be used together with 6 grams of the foaming agent of Example 1.

*Example 4*

When the powdered form of said resin (known in the trade as URAC 110) is used, it is necessary to decrease the amount thereof by 40% by weight of the liquid urea-formaldehyde resin mentioned in Examples 1, 2 and 3, otherwise the materials are processed the same way as set out in Example 1.

*Example 5*

In place of the foaming agent mentioned in Example 1, the alkyl sulfate type of foaming agent may be used (known in the trade as Duponol WA) but the amount of said foaming agent should be reduced to 6 grams. In all other respects, the materials are processed the same way as set out in Example 1.

Each of the processes set out in the foregoing examples may be equally well carried out by not using the foaming cells to produce a foam or folding in a foam, but rather to leave the foaming cells quiescent and utilizing such portions of the apparatus for merely feeding the said resin and the foaming agent to the secondary mixer.

The amount of the foaming agent utilized is determinative of the weight of the board by controlling its cellular structure. Gypsum board made according to the examples, without the use of a foaming agent, would produce a usable product, but its weight would exceed approximately 1700 pounds to each 1,000 square feet of ⅜ inch gypsum board. Those skilled in the art, on the basis of the disclosure of the examples of this specification, can readily determine the amount of foaming agent to be used to the specified quantities of gypsum, resin and water for the purpose of producing a plaster board of a desired weight. Thus, for instance, a thousand square feet of ⅜ inch plaster board made according to Examples 1 through 6 would weigh approximately 1,400 to 1,500 pounds. It is preferred, in carrying out the process, that to every 10 pounds of calcined gypsum and about 6½ pounds of water, the total amount of resin and foaming agent equal 11 grams, of which the foaming agent should not materially exceed 7½ grams. Thus, for instance, if the amount of resin is 3½, 4, 4½, 5, 5½ or 6 grams the amount of foaming agent recommended should be, respectively, 7½, 7, 6½, 6, 5½ or 5 grams, to produce board meeting the requirements of U. S. specification 51A for weight and breaking strength. Increasing the amount of foaming agent in the slurry will tend to produce board having a progressively weaker structure, which would not conform to the requirements of U. S. specification 51A, although such board might be found useful for some purposes.

As the alkaline-catalyzed partial condensation product of urea and formaldehyde is increased substantially over 6 grams to each 10 pounds of calcined gypsum or stucco, the hydrated gypsum tends to granulate more and more and ultimately the gypsum particles in the finished board will have no adhesion or cohesion but will take the form of granules much like the form of grains of sand, leaving the board without strength and of no utility.

If desired, products made according to this invention may have incorporated therein, during the preparation of the slurry, fillers of standard types, such as cork, cellulose, comminuted paper, vermiculite, etc. The final product, whether such fillers are incorporated or omitted, embodies in the core thereof, a homogenous, cellular structure.

Whenever the term gypsum board and like gypsum products is used in the appended claims, it is to be understood to include gypsum wall board, gypsum lath, plain or perforated, gypsum liner board or plaster board, gypsum sheathing, single or laminated, and gypsum slabs.

I claim:

1. The method of making gypsum board, or like gypsum products, comprising, mixing to each 10 pounds of calcined gypsum, between 2¼ grams and 6 grams of an alkaline-catalyzed partial condensation product of urea and formaldehyde, water and a foaming agent sufficient to impart cellular structure to the mass, then shaping the slurry to a predetermined configuration.

2. In the process according to claim 1 in which the amount of foaming agent added to the mix is 7½ grams to approximately each 10 pounds of calcined gypsum.

3. The steps in the method of making gypsum board, or like gypsum produces, comprising, mixing to each 10 pounds of calcined gypsum, 3½ grams of an alkaline-catalyzed partial condensation product of urea and formaldehyde and water to form a slurry and then shaping the slurry to a predetermined configuration.

4. In the method of making gypsum board, or like gypsum products, forming a slurry comprising water, calcined gypsum, a foaming agent and an alkaline-catalyzed partial condensation product of urea and formaldehyde, the proportion of the alkaline-catalyzed partial condensation product of urea and formaldehyde being 3½ grams to each 10 pounds of calcined gypsum, the amount of foaming agent being sufficient to impart cellular structure to the mass and then shaping the slurry to a predetermined configuration.

5. The method of making gypsum board, or like gypsum products, comprising, mixing to form a slurry, calcined gypsum, an alkaline-catalyzed partial condensation product of urea and formaldehyde, a foaming agent and water, the amount of alkaline-catalyzed partial condensation product of urea and formaldehyde by weight being not more than 6 grams and not less than 2¼ grams to each 10 pounds of calcined gypsum the amount of foaming agent in the slurry being greater than the amount of said condensation product, then shaping the slurry to a predetermined configuration.

6. A gypsum board having at least one facing a core comprising, a calcined gypsum in set condition and an alkaline-catalyzed partial condensation product of urea and formaldehyde, the amount of said resin not exceeding 6 grams and not less than 2¼ grams to each 10 pounds of calcined gypsum.

7. A gypsum board, or like gypsum product having a core, comprising calcined gypsum in set condition and an alkaline-catalyzed partial condensation product of urea and formaldehyde, the proportion of the alkaline-catalyzed partial condensation product of urea and formaldehyde being between 2¼ grams and 6 grams to each 10 pounds of calcined gypsum.

8. A gypsum board or like gypsum product, having a homogenous cellular structure, comprising calcined gypsum in set condition, an alkaline-catalyzed partial condensation product of urea and formaldehyde and a foaming agent, the proportion of the alkaline-catalyzed partial condensation product of urea and formaldehyde not exceeding, by weight, 6 grams and not less than 2¼ grams to each 10 pounds of calcined gypsum, the weight of the foaming agent being at least as great as the weight of the condensation product.

9. In the method of making gypsum board or like gypsum products, the steps comprising mixing to a slurry water, calcined gypsum and from 2¼ grams to 6 grams, to each 10 pounds of calcined gypsum, of an alkaline-catalyzed partial condensation product of urea and formaldehyde, then shaping the slurry to a predetermined configuration.

10. The method of making gypsum board comprising forming a slurry by mixing to each 10 pounds of calcined gypsum 3½ grams of an alkaline-catalyzed partial condensation product of urea and formaldehyde, 7½ grams of a foaming agent and from 6¼ to 6½ pounds of water, shaping the slurry to a predetermined configuration and applying a facing sheet thereto.

CHARLES H. CUPPETT.

REFERENCES CITED

The following references are of record in the file of this patent:

UNITED STATES PATENTS

| Number | Name | Date |
|---|---|---|
| 2,346,999 | Sandford et al. | Apr. 18, 1944 |

FOREIGN PATENTS

| Number | Country | Date |
|---|---|---|
| 523,450 | Great Britain | July 15, 1940 |